United States Patent Office 3,528,234
Patented Sept. 15, 1970

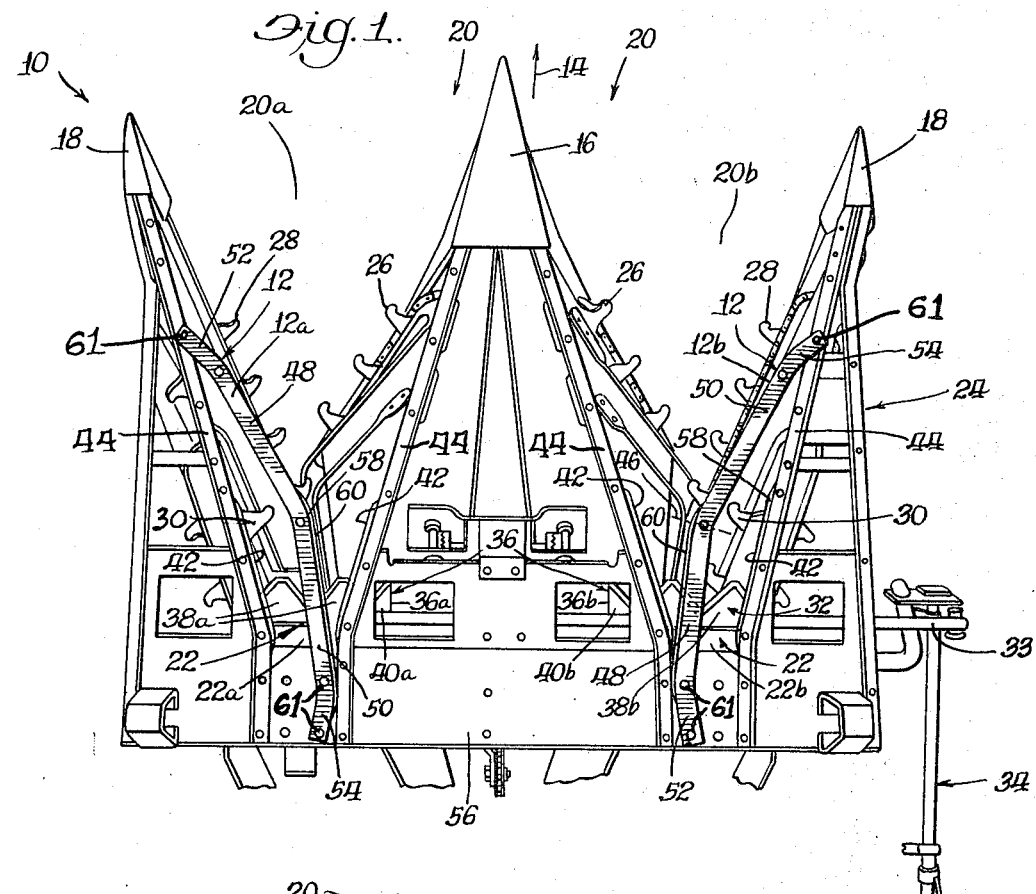
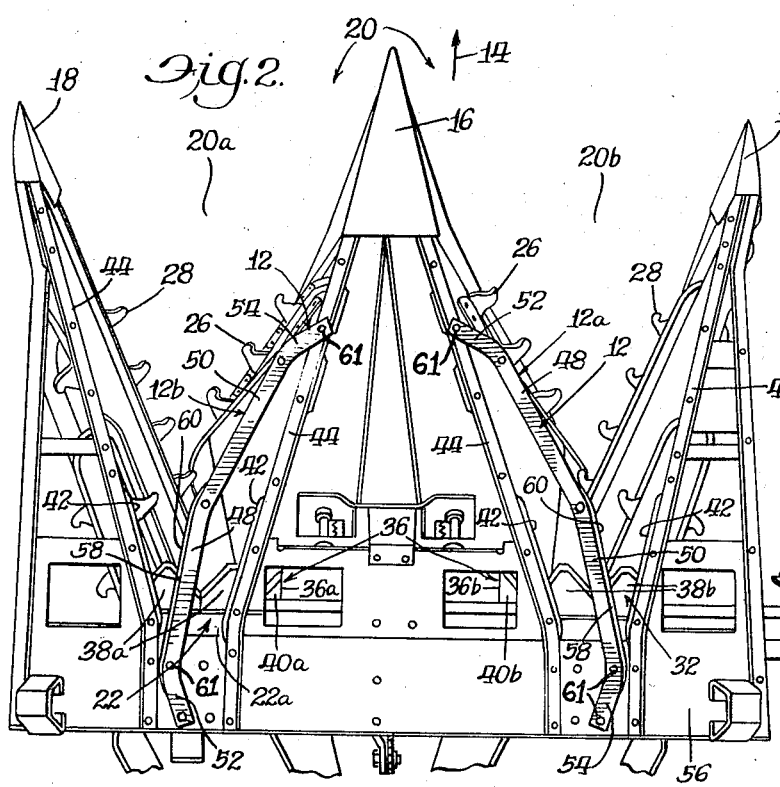
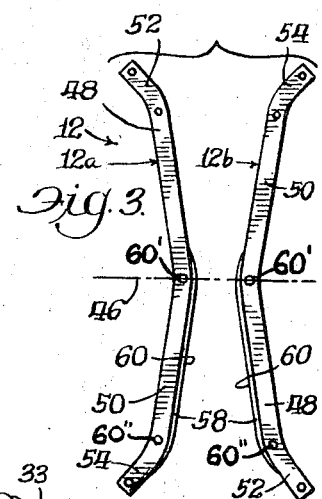

3,528,234
VARIABLE SPACING ROW CROP HARVESTER
John J. Kowalik, Glenview, and Ronald F. Zitko, Downers Grove, Ill., assignors to International Harvester Company, Chicago, Ill., a corporation of Delaware
Filed May 28, 1968, Ser. No. 732,742
Int. Cl. A01d 45/02
U.S. Cl. 56—119                10 Claims

ABSTRACT OF THE DISCLOSURE

Multiple row harvester having a frame defining fixed passages for the respective crop rows, each passage being of substantial width to accommodate wide variation of spacing of the rows, and having guides detachably mounted and selectively positionable on opposite sides of the passages, to guide and confine the crop plants at different lateral locations in the respective passages according to the spacing of the rows.

CROSS REFERENCES

Copending application of James H. Bornzin, Ser. No. 732,741, filed May 28, 1968, now Pat. No. 3,496,708, for Variable Spacing Row Crop Harvester (IHC D-8945), assigned to the assignee of the present invention.

Copending application of Robert E. Martner and Carmen S. Phillips, Ser. No. 732,740, filed May 28, 1968, for Variable Spacing Row Crop Harvester (IHC D-8936), assigned to the assignee of the present invention.

PRIOR ART

U.S. Pat. No. 3,365,867, Phillips, issued Jan. 30, 1968.

BACKGROUND

The invention is applied to a row crop harvester of a generally known kind, constructed for accommodating row plants. The spacing of the rows of various plants is not uniform, and they may vary throughout quite a wide range. For example, corn rows may be as closely spaced as 28 inches and as widely spaced as 42 inches and it is desired that a harvester be constructed for accommodating rows spaced within this range.

As a general rule, the plant rows of any one farmer or user are of the same spacing, i.e., the rows would not be spaced differently from one field to the next. A harvester for him then if it is provided with means for harvesting a field o fa predetermined row spacing would generally be satisfactory, but the farmers from one to the next may have differently spaced rows. In that case it would be relatively expensive for the manufacturer to provide harvesters constructed completely differently throughout to accommodate the different spacings, but in the present case a single harvester can be provided which will accommodate the maximum variation in spacing of rows, this harvester then constituting a basic or principal machine. Then with the addition of a simple and inexpensive construction, the harvester which is constructed for the full range of spacing can be adapted to an individual's particular spacing, with consequent economy in production of the equipment.

As pointed out in the prior art patent referred to above, the throats of the passage each may be 7 inches wide, the width of the two together totaling the variation in spacing referred to above, namely, fourteen inches, half of which is accommodated in each of the two passages. While the harvester as disclosed in that patent is effective for the purpose intended, there are times when the crop plants may be bunched too much at one side or the other of the passages, resulting in lesser efficiency in the cutting operation.

OBJECTS OF THE INVENTION

A broad object of the present invention is to provide, in a harvester of the general kind referred to, guides for guiding and confining the crop plants to a certain location laterally in the wide passages, to render the cutting operation more efficient.

Another object is to provide guides of the character referred to which can be selectively positioned in the passage for guiding and confining the crop plants to different lateral locations in the passages, according to the nominal spacing of the rows.

More specifically, means is provided which, as a single means or set of means, can be applied to the harvester and will accommodate all spacings, but more efficiently accommodating the rows of a particular spacing.

Still another object is to provide guide means in a row crop harvester which is of simple construction and easily positionable in each of opposite positions or attitudes in the passages of the harvester, to accommodate rows of different spacings.

A more specific object is to provide guide means of the character just referred to, for each of the passages, and each of which is positionable alternatively on opposite sides of the respective passage, and is so symmetrically constructed as to enable its use in opposite end-to-end positions relative to the direction of movement of the harvester along the rows.

Still another object is to provide guide means of the character referred to, in conjunction with a harvester having a rigid framework defining plant passages, and movable cutting means therein, and in which the cutting means remains in a single location regardless of the different positions of the guide means, and the guide means becomes in effect a portion of the rigid framework.

DESCRIPTION OF A PREFERRED EMBODIMENT

In the drawings:
FIG. 1 is an under view of the principal portion of a row harvester, and showing the device of the present invention applied thereto;
FIG. 2 is a view similar to FIG. 1 but showing the devices in alternate positions; and
FIG. 3 is a perspective view showing the guide means of the invention in respectively opposite positions, as arranged in the harvester.

A harvester in its entirety is indicated at 10, to which the invention is applied, this harvester being of the same construction disclosed in the prior patent mentioned but with changes to be referred to hereinbelow. The invention includes a pair of guides or members 12, individually identified 12a and 12b for convenience. The harvester is adapted to move along the plant rows, in the direction indicated by the arrow 14, and includes a center gathering point 16 and side gathering dividers 18 defining passages 20, individually identified 20a and 20b.

The passages converge rearwardly and terminate in throats 22 similarly individually identified 22a and 22b. The harvester includes a rigid frame structure 24 of suitable construction and made up of suitable elements such as angle irons etc., defining the passages 20. Mounted in the frame are gathering chains in each passage, these including an inner chain 26, an outer chain 28 and a butt chain 30 below the outer chain 28. Mounted in each passage also are pressure straps 31 secured at their front ends to the center gathering point 16 and having their rear ends loose and detached and extending rearwardly in the passage into or beyond the throat 22. These pressure straps cooperate with the gathering chain 28 and the butt chain 30 in confining the plant stalks against those two chains and aiding the confinement of the stalks in gathering them rearwardly in the passage.

Incorporated in the harvester is a cutting means indicated generically at 32 which takes the form of a rectilinearly reciprocating sickle. This sickle includes a bar 33 driven by suitable means 34 which in turn is driven by any suitable source, such as the impelling tractor. The sickle includes two segments 36 individually identified 36a and 36b, each segment including in this instance two full sections 38a and 38b, and a half section 40a, 40b respectively. These sections are mounted on the bar 33 and upon reciprocation of the sickle, in the usual manner, the plant stalks are cut as they pass through the throat. The sickles work against edge knives 42 mounted on suitable elements 44 of the frame in suitable locations spanning, in fore-and-after direction, the complete range of cutting effectiveness of the sickle. At this point it is appropriate to point out a distinction of the structure of the harvester as a whole from that disclosed in the prior art patent referred to above, this difference being that the ledger dividers (54) of that patent are omitted from the present construction.

The guides 12 are identical, and each is symmetrical about a center transverse line indicated at 46 (FIG. 3), each including main segments 48, 50, and outwardly of those main segments, or longitudinally therebeyond, are end segments 52, 54. The main segments 48, 50 are leading or fore segments, or trailing or aft segments, respectively, depending upon their position in the harvester, as explained more fully hereinbelow.

These guides 12 may be of suitable construction such as of angle iron, and are rigidly connected with the frame as by securing one end segment 52 (right half, FIG. 1) to the frame element 44, and the other end segment 54 to an element 56 of the frame which may be a flat plate at the rear end of the frame rearwardly beyond the sickle. Detachably mounted on the trailing end of each guide 12 is a knife blade 58 as by bolts 60', 60" through appropriately arranged apertures in the blade and guide. Each blade presents an edge 60 opposed to the respective edge knife 42 on the opposite side of the throat. The knife blades 58 can be mounted on the selected one of the main segments 48, 50 according to the position of the respective guide 12.

The guides 12 are of course rigid, and when mounted on the frame 24 become effectively a rigid part thereof. The shape of the guides 12 is such that the leading segment is nearly parallel with the corresponding side of the passage 20, and hence at a substantial angle to the direction of movement of the harvester, while the trailing segment is also at an angle to the direction of movement, but at a lesser angle and more nearly parallel with that movement.

In the position of the guides 12 in FIG. 1, the trailing segments (50 left side, 48 right side) are adjacent to, and opposed to, the inner sides of the passages so that they operate to guide and confine the crop plants against those sides corresponding to narrow spacing of the rows. The knife blades 58 and corresponding edge knives 42 converge rearwardly and extend rearwardly beyond the cutting effectiveness of the sickle.

The guides 12 are of course detachably mounted by bolts 61, through apertures in the frames 44 and rear portion 56, and can be remounted in opposite positions, namely on opposite sides of the respective passages. Specifically, the guides 12 may be demounted from the position shown in the left hand passage 20a of FIG. 1, and rotated about the axis 46 on about the axes of openings 60', 60' to a position represented in FIG. 2 in which the same guide is shown in the same passage, but in opposite end for end position and with the different segments thereof in correspondingly oppositely arranged positions, as related to the direction of movement of the harvester. In FIG. 2, the end segment 52 which was at the leading end in FIG. 1 is now (FIG. 2) secured to the element 56 at the trailing end while the previously arranged trailing end segment 54 is now (FIG. 2) at the forward end and secured to the frame element 44. The knife blade 58 may be removed from the previously arranged trailing segment 50 (FIG. 1) and secured to the now trailing segment 48 (FIG. 2), with similar replacement in the right hand passage 20b. In the arrangement represented in FIG. 2 the trailing portions of the guides 12 are disposed toward the outer sides of the passages, with the knife blades thereon opposed to edge knives 42 which are on the outer sides of the passages, mounted on the corresponding frame elements 44.

It is to be understood of course that the knife blades 58 may be continuous throughout the two main segments 48, 50, if it should be so desired, and in such case would not require being re-positioned in re-positioning the guides.

The guides 12 are selectively positioned relative to the inner or outer sides of the passages according to the spacing between the rows to be harvested. While the passages 20 and the throats 22 are positioned and dimensioned to accommodate all of the plants to be harvested, it occurred heretofore on occasion that the plants would jam or bunch up at one side or the other, impairing the utmost efficiency. In the use of the device of the present invention the complete range of variation of the crop rows can be accommodated, with more precise lateral positioning of the plants within the passages.

The cutting means, sickle 32, remains in position in the machine regardless of the positions of the guides 12. The guides serve to guide and confine the plant stalks toward the side of the passages corresponding to their nominal laterally spaced positions. The sickle sections 38, 40 work against the knife blades 58 on the guides 12 on the one hand and either of the edge knives 42 on the opposite sides of the passage, according to the position of the guides, on the other hand, the guides 12 confining the plant stalks at one side or the other of the passages rendering the sickle 32 effective in cutting. This is a refinement on the invention referred to in the prior art patent mentioned, since in the construction in that patent while the device was effective for cutting the stalks throughout the full range of the width of the passage, or throat, there was a tendency in certain instances where the stalks became very voluminous for the sickle to become less effective than desired. The guides constitute only a very small element of cost of the overall construction, while still enabling an expensive main machine to be adapted to specific row spacing for different users.

We claim:

1. A row crop harvester having a plurality of passages for receiving the plants of a corresponding number of rows respectively, the passages each being of substantial width for receiving the plants notwithstanding variation in spacing between the rows, means in each passage for cutting the plants in that passage, and interchangeable guide means in each passage shaped for positioning at either side of the passage and comprising a member having a portion disposable in converging relation to a selected side of the passage for guiding the plants to a predetermined position laterally in that passage according to the spacing between the rows, and knife means mounted on the member in shearing cooperation with the cutting means.

2. The invention set out in claim 1 wherein the cutting means is fixed in position in the passages independently of the positioning of the guide means.

3. The invention set out in claim 2 wherein the cutting means are operable throughout the full width of the respective passages independently of the positioning of the guide means.

4. The invention set out in claim 1 wherein each passage has a forward wide portion converging rearwardly to a relatively narrow throat, said member in each passage having a leading section inclined substantially to the direction of movement of the harvester and a trailing section positioned more closely adjacent the line of movement, and said knife means being mounted on the trailing section.

5. The invention set out in claim 4 wherein the guide means member is symmetrical about a substantially transverse line and the leading and trailing sections become oppositely so oriented according to which side of the passage it is positioned, and being so shaped that its ends are oppositely arranged, relative to the direction of movement of the harvester, on opposite sides of the passage, and such sections become respectively leading and trailing according to the position of the guide means on the respective side of the passage.

6. The invention set out in claim 5 wherein said knife means is selectively positionable on each of said sections so as to enable the positioning of the knife means in the trailing section.

7. A row crop harvester movable along a line of travel and including a framework having fixed elements defining each of a pair of passages, the passages opening at the front and converging toward the rear and forming throats of substantial width, cutting means in each of the passages adjacent the throats for cutting the crop plants as they move through the passage, interchangeable guiding and confining means in each of the passages removably secured in each of opposite alternate positions and in each position being fixed in relation to one side of the passage and opposing the frame elements defining an opposite side of the passage and coacting therewith for defining a relatively narrow section of the passage adjacent the throat substantially narrower than the maximum width of the throat, said cutting means being fixed in location relative to the alternate positions of the guiding means and being operably movable transversely to the passage, the guiding means being operative for confining the crop plants adjacent one side of the respective passages, said guiding means being symmetrical about a transverse center line and adaptable for positioning in 180° displaced relationship from one side to the other side of the passage.

8. The invention set out in claim 7 wherein the plurality of cutting means are arranged on a common movable member and movable rectilinearly transversely of the passages.

9. The invention set out in claim 7 wherein the guiding means and the opposed elements of the frame defining their respective passages converge rearwardly to a position closely approximating zero rearwardly beyond the cutting means.

10. A row crop harvester adapted for moving along crop rows and including a frame having fixed side elements defining passages for receiving the plants of corresponding rows, the passages converging rearwardly and terminating in throats, cutting means operably mounted in the throats, and rigid guide means in each passage for guiding the crop plants to predetermined positions in the respective passages, interchangeable guide means detachably selectively mounted on one or the other elements of the frame and selectively positionable in the passages for selectively guiding the plants at different laterally displaced positions in the passages and each said guide means comprising a member converging toward the respective throat with the opposed side element of the respective passage, and knife means mounted on the member in shearing cooperation with the cutting means.

References Cited

UNITED STATES PATENTS

| | | | |
|---|---|---|---|
| 1,491,069 | 4/1924 | Scranton | 56—102 |
| 2,783,603 | 3/1957 | Smith et al. | 56—98 XR |
| Re. 24,565 | 11/1958 | Wigham | 56—98 |
| 2,970,420 | 2/1961 | Schmidt | 56—98 |
| 2,984,962 | 5/1961 | Heising | 56—102 |
| 3,213,597 | 10/1965 | Procter | 56—102 XR |
| 3,365,867 | 1/1968 | Phillips | 56—53 |

LOUIS G. MANCENE, Primary Examiner

J. A. OLIFF, Assistant Examiner